United States Patent [19]

Enge et al.

[11] Patent Number: 5,621,646
[45] Date of Patent: Apr. 15, 1997

[54] WIDE AREA DIFFERENTIAL GPS REFERENCE SYSTEM AND METHOD

[75] Inventors: Per K. Enge; Todd F. Walter, both of Mountain View; Yi-Chung Chao, Stanford, all of Calif.

[73] Assignee: Stanford University, Palo Alto, Calif.

[21] Appl. No.: 681,087

[22] Filed: Jul. 22, 1996

Related U.S. Application Data

[63] Continuation of Ser. No. 374,165, Jan. 17, 1995, abandoned.

[51] Int. Cl.$^6$ ............................................. G01S 5/02
[52] U.S. Cl. .................... 364/449; 364/443; 364/458; 364/463; 364/459; 364/439; 342/356; 342/357; 342/358
[58] Field of Search ................................... 364/443, 449, 364/458, 459, 463, 439; 342/356, 357, 358

[56] References Cited

U.S. PATENT DOCUMENTS

| | | | |
|---|---|---|---|
| 4,646,096 | 2/1987 | Brown | 342/357 |
| 4,797,677 | 1/1989 | MacDoran et al. | 342/352 |
| 4,912,475 | 3/1990 | Counselman, III | 342/352 |
| 5,093,800 | 3/1992 | Ifune | 364/578 |
| 5,155,490 | 10/1992 | Spradley, Jr. et al. | 364/357 |
| 5,202,829 | 4/1993 | Geier | 364/449 |
| 5,225,842 | 7/1993 | Brown et al. | 342/357 |
| 5,323,322 | 6/1994 | Mueller et al. | 364/449 |
| 5,379,224 | 1/1995 | Brown et al. | 364/449 |
| 5,390,124 | 2/1995 | Kyrtsor | 364/449 |

OTHER PUBLICATIONS

D. Lapucha, M. Huff, "Multi–Site Real–Time DGPS System Using Starfix Link; Operational Results", ION–GSP–92, pp. 581–588.

M. Lage, B. Elrod, "The FAA's WIB/WDGPS Testbed and Recent Results", ION–GPS–93, pp. 487–493.

F. Haas, M. Lage, S. Kalinowski, "GPS Wide Area Augmentation System (WAAS) Testbed Results –Phase 1D Testbed Results", ION Annual Meeting, pp. 239–248.

C. Kee, B. Parkinson, "Algorithms and Implementation of Wide Area Differential GPS", ION–GPS–92, pp. 1–8.

C. Kee, "Wide Area Differential GPS(WADGPS)", Changdon Kee, Dec. 1993, pp. i–128.

C. Goad, "Surveying with GPS", The Global Positioning System, pp. 1–17.

H. Janes, R. Langley, "Analysis of Tropospheric Delay Prediction Models: Comparisons with Ray–Tracing and Implications for GPS Relative Positioning, Bulletin Geodesiue", vol. 65, pp. 151–161, 1991.

T. Walter, C. Kee, Y. C. Chao, Y. J. Tsai, U. Peled, J. Ceva, A. K. Barrows, E. Abbott, D. Powell, P. Enge, and B. Parkinson, "Flight Trials of the Wide Area Augmentation System (WAAS)", ION–GPS–94, pp. 1–9.

*Primary Examiner*—Kevin J. Teska
*Assistant Examiner*—Thai Phan
*Attorney, Agent, or Firm*—Flehr, Hohbach, Test, Albritton & Herbert

[57] ABSTRACT

A GPS reference system and corresponding method utilizing a network of reference stations and a master station. Each reference station receives GPS signals from GPS satellites it observes and computes in response a pseudo-range residual for each GPS satellite it observes. The master station is in communication with the reference stations to receive the computed pseudo-range residuals and comprises a pseudo-range residual synchronizer, an ephemeris and clock correction estimator for each GPS satellite observed by the reference stations, and a transmitter. The pseudo-range residual synchronizer is responsive to the received pseudo-range residuals in order to compute clock differences between the reference stations and remove the clock differences from the received pseudo-range residuals so as to synchronize them. Each ephemeris and clock correction estimator computes an ephemeris correction and a clock correction for the corresponding GPS satellite in response to each synchronized pseudo-range residual for the corresponding GPS satellite. The transmitter transmits to users the computed ephemeris and clock corrections for each GPS satellite observed by the reference stations.

15 Claims, 10 Drawing Sheets

5,621,646

WIDE AREA DIFFERENTIAL GPS REFERENCE SYSTEM AND METHOD

This invention was supported in part by grant 93-G-004 from the Federal Aviation Administration. The U.S. Government may therefore have rights to this invention.

This is a continuation, of application Ser. No. 08/374,165 filed Jan. 17, 1995 now abandoned.

FIELD OF INVENTION

The present invention relates generally to differential GPS reference systems and methods. More specifically, the present invention pertains to a wide area differential GPS (WDGPS) system and method that employs common view time transfer and minimum norm solution techniques to provide GPS satellite ephemeris and clock corrections to GPS users.

BACKGROUND OF INVENTION

The global positioning system (GPS) is a satellite-based navigation and time transfer system developed by the U.S. Department of Defense. It serves marine, airborne and terrestrial users.

The system includes GPS satellites that each transmit L1 and L2 GPS signals. The L1 and L2 GPS signals comprise modulated carrier signals at the GPS L1 and L2 frequencies (1,575 and 1,227 MHz) which are each modulated by a coarse-acquisition pseudo-random (C/A) code, an encrypted precision pseudo-random (P) code, and navigation data. The navigation data includes the transmitting GPS satellite's orbit location and clock offset from GPS time.

Since the P code is encrypted, it is unavailable to most users. However, a user can determine the pseudo-range to each GPS satellite in view based on the time of arrival of the C/A code contained by the GPS signals transmitted by the GPS satellite. The user can compute a position fix based on the determined pseudo-ranges to the GPS satellites in its view and the locations and clock offsets for these GPS satellites contained in the navigation data of the GPS signals they transmit.

However, the U.S. Department of Defense engages in selective availability and deliberately misrepresents the true location and clock offsets of the GPS satellites in the navigation data of the GPS signals they transmit. Moreover, the ionosphere and the troposphere delay the arrival of these GPS signals at the user's location. Thus, these factors affect the accuracy and integrity of GPS for the user.

In order to improve the accuracy and integrity of GPS, GPS may be augmented by a network of ground-based reference stations. The reference stations monitor the health of the GPS signals transmitted by the GPS satellites in their view and generate corrections to these signals which are then transmitted to the user. The user can accurately determine his position based on the GPS signals he receives from the GPS satellites and the corrections to these signals he receives from the reference stations. This form of GPS is known as differential GPS (DGPS).

A number of systems and methods have been developed for wide area DGPS (WDGPS). However, all of them suffer from various problems which render them undesirable.

One of these approaches is called position domain WDGPS and combines the information from multiple wide area reference stations (WRSs) in the position domain. Such an approach is described in "Multi-Site Real-Time DGPS System Using Staffix Link: Operational Results", by D. Lapucha and M. Huff, Proceedings of the Fifth International Technical Meeting of the Satellite Division of the Institute of Navigation, Albuquerque, September 1992.

In this approach, each WRS acts as a local area DGPS (LDGPS) reference station. Based on its known fixed position, it computes for each GPS satellite in view a corresponding pseudo-range correction to the GPS satellite. Each WRS then transmits a stream of LDGPS pseudo-range corrections to the user. The user computes pseudo-ranges to the GPS satellites in his view based on the GPS signals received from these GPS satellites. The user then applies the pseudo-range corrections to the computed pseudo-ranges. If there are M WRSs, the user computes M position fixes and the corresponding covariance matrices. The user then uses the covariance matrices to form a single weighted position fix.

However, this approach does not involve the estimation of any of the underlying states of the GPS satellites, namely GPS satellite ephemeris and clock errors. Nor does it involve the estimation of the clock differences between the different reference stations. These type of errors behave quite differently and could be mitigated if they were separated. Since this approach allows these errors to be combined, it unfortunately does not allow a-priori information about each of the underlying states to be introduced into the estimation process. As a result, the accuracy of each computed pseudo-range correction decreases rapidly with age and user to reference station separation.

Additionally, this approach requires M independent data streams to be sent to the user if there are M different reference stations. Thus, it requires a rather large data bandwidth to implement.

Another approach is called measurement domain WDGPS and combines the pseudo-range measurements from multiple WRSs. Such a system is described in "The FAA's WIBANDGPS Testbed and Recent Test Results", by M. Lage and B. Elrod, Proceedings of the Sixth International Technical Meeting of the Satellite Division of the Institute of Navigation, Salt Lake City, 1993, and in "GPS Wide Area Augmentation System (WAAS) Testbed Results—Phase ID Testbed Results", by F. Haas, M. Lage, and S. Kalinowski, Proceedings of the Annual Meeting of the Institute of Navigation, Colorado Springs, June 1994.

In this approach, each WRS computes a pseudo-range correction to each GPS satellite in view. These pseudo-range corrections are sent to a wide area master station (WMS) rather than the user. The WMS uses well known common view time transfer techniques to estimate the clock differences between the WRSs. The estimated clock differences are then removed from the pseudo-range corrections. As a result, these synchronized pseudo-range corrections are all referenced to a common master clock. The WMS then averages for each GPS satellite the synchronized pseudo-range corrections for the GPS satellite. These averaged pseudo-range corrections are then transmitted to the user and used by the user in the same way as described earlier for the position domain WDGPS approach.

The measurement domain WDGPS approach requires less data bandwidth than the position domain WDGPS approach since a single averaged data stream for each GPS satellite is sent to the user rather than M different data streams. However, in this approach as well, the pseudo-range corrections degrade rapidly with age and user to reference station separation since the underlying states of the GPS satellites are not estimated and therefore the user cannot leverage the known behavior of the underlying states to make accurate position fixes. This frailty is especially pronounced if the ephemeris errors associated with one or more of the GPS satellites is large or the ionosphere is introducing errors which vary spatially.

Still another approach is called state space WDGPS which uses the information from multiple WRSs to estimate the underlying states of the GPS satellites, the underlying state of the ionosphere, and the underlying clock differences between the WRSs. Such a system is described in "Algorithms and Implementation of Wide Area Differential GPS", by C. Kee and B. Parkinson, Proceedings of the Fifth International Technical Meeting of the Satellite Division of the Institute of Navigation, Albuquerque, September 1992, and also in "Wide Area Differential GPS (WADGPS)", by C. Kee, Stanford University, Ph.D Dissertation, December 1993.

In this approach as well, each WRS computes a pseudo-range residual (i.e., correction) for each GPS satellite in view. The computed pseudo-range residuals are sent to a WMS which uses one large estimator to simultaneously compute the clock differences between the WRSs and the ephemeris and clock corrections for the ephemeris and clock errors of each GPS satellite in view of the network.

The estimator in this approach must solve a system of equations which contains $4K+(M-1)$ unknowns and MK knowns, where K is the number of satellites in view and M is the number of reference stations. This stems from the fact that each satellite has 3 unknown components of ephemeris error and 1 unknown clock error. In addition, there are $M-1$ unknown offsets between the clocks of the WRSs clocks. At the same time, the system of equations contains MK knowns corresponding to the K pseudo-range residuals computed by each of the M WRSs.

When $4K+(M-1)>MK$, the system is under determined and the WMS must use a minimum norm solution. When $4K+(M-1)=MK$, then the system is exactly specified and can be readily inverted. When $4K+(M-1)<MK$, then the system is over specified and the pseudo-inverse yields an estimate with minimum mean square error.

Unlike the previously discussed approaches, the state space WDGPS approach separates the underlying states of the system, and as such, it enables the use of a-priori models and side information for these states. However, its complexity impedes the straight forward integration of such models.

Moreover, it requires a greater data bandwidth than is necessary. This occurs, because the WRS network can be rather sparse and, as such, the system of equations used by the WMS is frequently under determined. Specifically, rising GPS satellites that have just appeared over the horizon are of great concern to WDGPS users because they can greatly improve the geometry and accuracy of the position fix. However, the system is always under determined in the case of a rising GPS satellite. Even though the minimum norm solution described above yields an accurate correction for a newly rising GPS satellite, the quickly varying components of the GPS satellite clock correction splatter into the GPS satellite ephemeris correction. Consequently, the ephemeris correction must be sent as frequently as the clock correction, thereby increasing the required data bandwidth.

A similar approach is described in U.S. Pat. No. 5,323,322 issued on Jun. 21, 1994 to Mueller, et. al. In this approach, ephemeris and clock corrections for a particular GPS satellite can be provided to a user only if the GPS satellite is observed by five or more WRSs. However, as indicated earlier, rising GPS satellites are very important to users since they provide added leverage for computing accurate position fixes. Thus, this approach is not capable of providing a user with ephemeris and clock corrections for newly rising GPS satellites.

SUMMARY OF INVENTION

The foregoing problems are solved by a GPS reference system and corresponding method utilizing a network of reference stations and a master station. Each reference station receives GPS signals from GPS satellites it observes and computes in response a pseudo-range residual for each GPS satellite it observes. The master station is in communication with the reference stations to receive the computed pseudo-range residuals and comprises a pseudo-range residual synchronizer, an ephemeris and clock correction estimator for each GPS satellite observed by the reference stations, and a transmitter. The pseudo-range residual synchronizer is responsive to the received pseudo-range residuals in order to compute clock differences between the reference stations and remove the clock differences from the received pseudo-range residuals so as to synchronize them. Each ephemeris and clock correction estimator computes an ephemeris correction and a clock correction for the corresponding GPS satellite in response to each synchronized pseudo-range residual for that GPS satellite. The transmitter transmits to users the computed ephemeris and clock corrections for each GPS satellite observed by the reference stations.

DESCRIPTION OF SPECIFIC EMBODIMENTS

Figure 1:
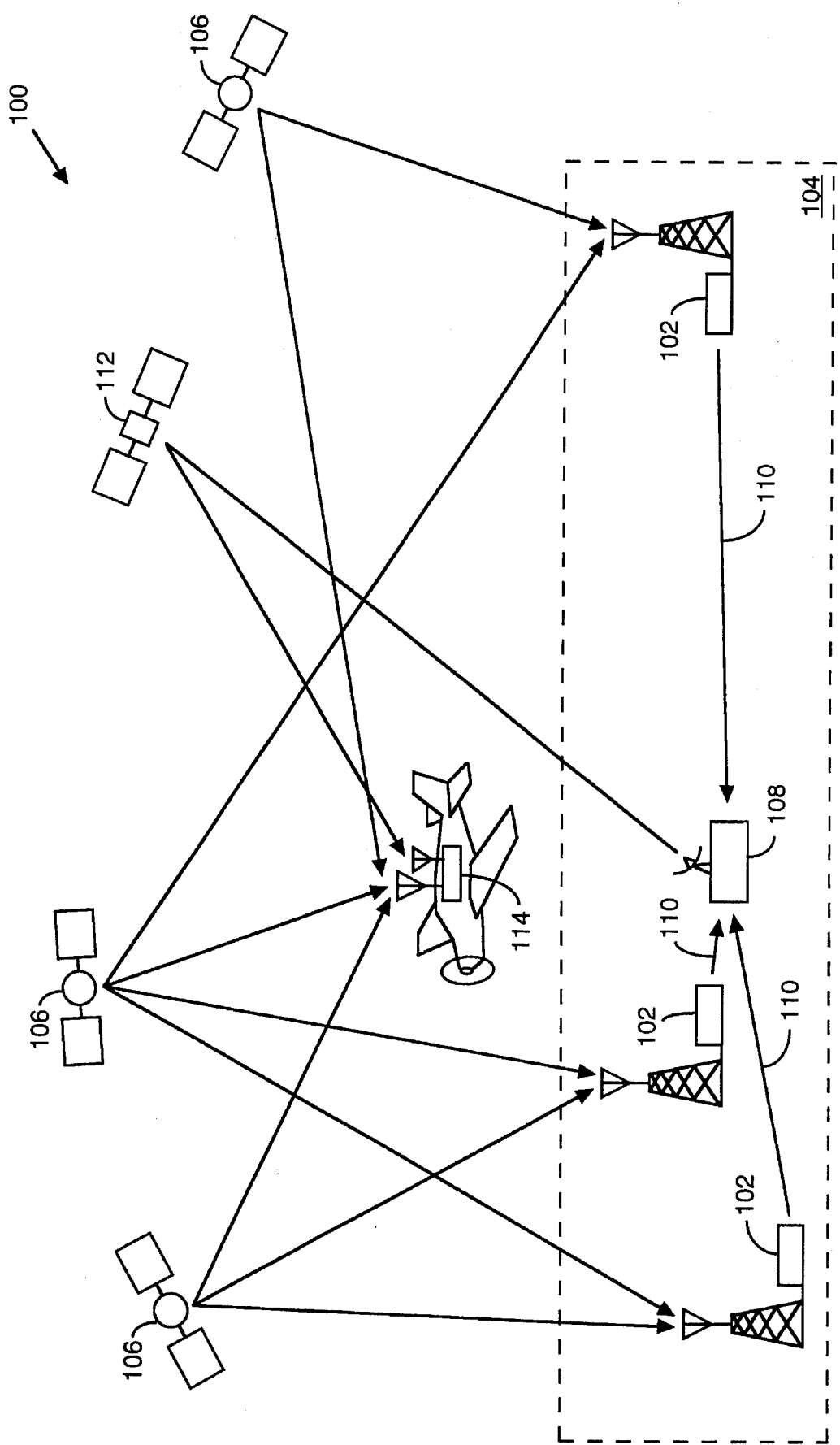
FIG. 1 shows a wide area differential GPS (WDGPS) system in accordance with the present invention.

Referring initially to FIG. 1, there is shown a wide area differential GPS (WDGPS) network 100 that includes a WDGPS reference or augmentation system 104. The WDGPS reference system includes a network of wide area reference stations (WRSs) 102. Each WRS receives L1 and L2 GPS signals from each of the GPS satellites 106 that are in its view. In response, each WRS observes each of the GPS satellites in its view and computes a pseudo-range residual and an ionospheric delay estimate for each observed GPS satellite. The pseudo-range residuals and ionospheric delay estimates computed by each WRS are provided to the wide area master station (WMS) 108 of the WDGPS reference system via a data communication link 110. The WMS in response computes ephemeris and clock corrections for each GPS satellite observed by the WRSs and computes a grid of ionospheric corrections. The WMS then transmits the ephemeris, clock, and ionospheric corrections to the geostationary satellite 112. The geostationary satellite 112 retransmits these corrections so that a mobile user's GPS positioning system 114 receives them along with the L1 GPS signals from each GPS satellite it observes. The user's GPS positioning system then computes its position based on the received GPS signals and the received ephemeris, clock, and ionospheric corrections.

Wide Area Reference Stations (WRSs)

Figure 2:
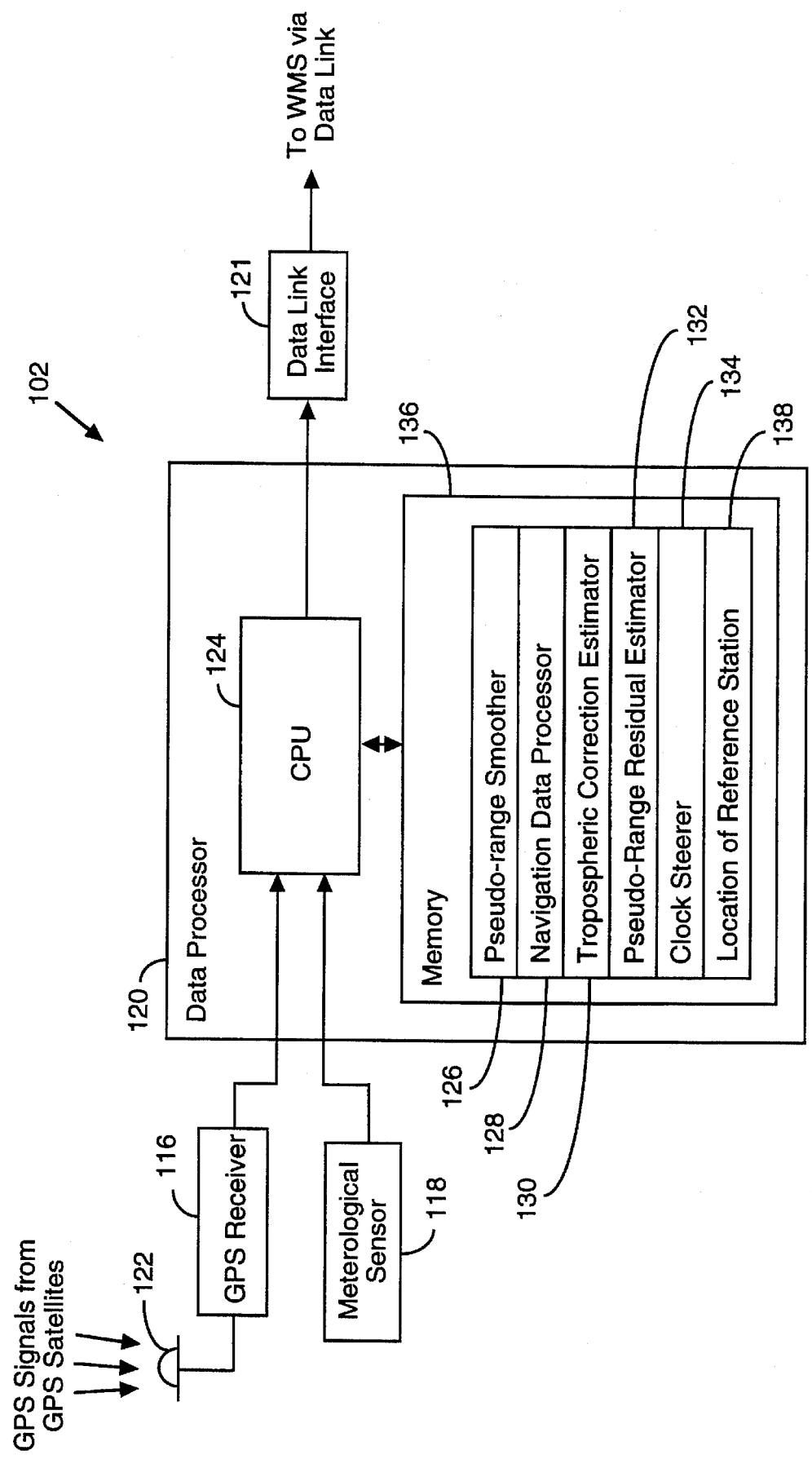
FIG. 2 provides a block diagram of a wide area reference station (WRS) used in the WDGPS system of FIG. 1.

As shown in FIG. 2, each WRS 102 includes a conventional survey quality dual frequency GPS receiver 116, a meteorological sensor 118, a data processor 120, and a data link interface 121. The GPS receiver includes a conventional GPS antenna 122 for receiving L1 and L2 GPS signals. The data processor includes a central processing unit (CPU) 124 that runs the pseudo-range smoother 126, the navigation data processor 128, the tropospheric correction estimator 130, the pseudo-range residual estimator 132, and the clock steerer 134 which are all stored in the memory 136. The memory also stores the precisely surveyed location 138 of the WRS.

Figure 3:
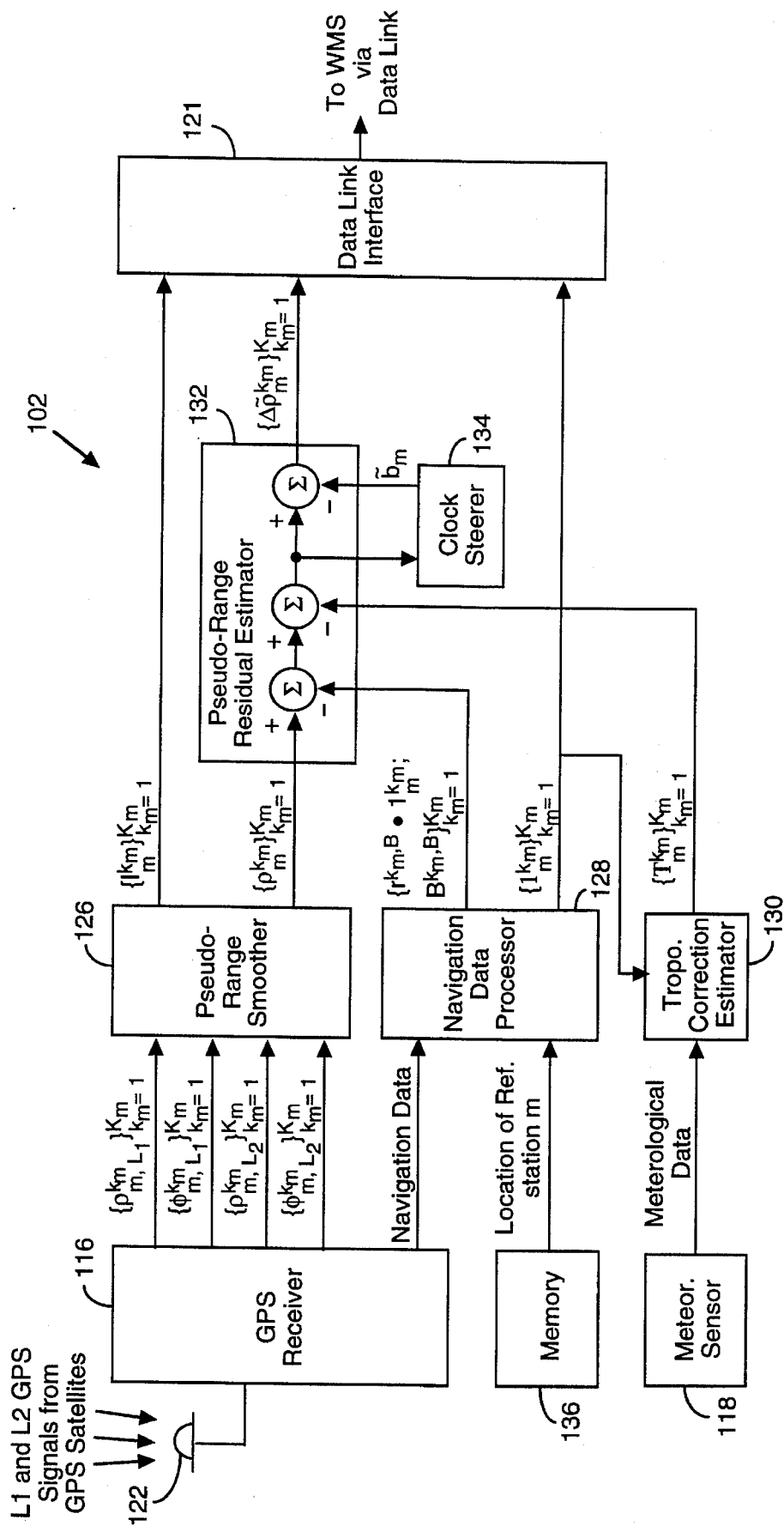
FIG. 3 shows the operation of the WRS of FIG. 2.

Turning to FIGS. 1 and 3, the GPS antenna 122 of each WRS 102 receives L1 and L2 GPS signals from each of the GPS satellites 106 in view of the WRS and the GPS receiver 116 in response observes each of these GPS satellites. For each observed GPS satellite, the GPS receiver computes at each of its measurement epochs L1 and L2 pseudo-ranges $\rho_{m,L1}^{k_m}$ and $\rho_{m,L2}^{k_m}$ (from the WRS to the corresponding GPS satellite) based on the L1/CA and L2/CA codes received from the GPS satellite, where $k_m$ represents the kth GPS satellite observed by the mth WRS. In addition, the GPS receiver makes at each epoch L1 and L2 carrier phase measurements $\phi_{m,L1}^{k_m}$ and $\phi_{m,L2}^{k_m}$ of the L1 and L2 carrier signals transmitted by each GPS satellite it observes. In the preferred embodiment, the measurement epochs occur at one second intervals (i.e., 1 Hz).

The sets of L1 and L2 pseudo-ranges $\{\rho_{m,L1}^{k_m}\}_{k_m=1}^{K_m}$ and $\{\rho_{m,L2}^{k_m}\}_{k_m=1}^{K_m}$ and the sets of L1 and L2 carrier phase measurements $\{\phi_{m,L1}^{k_m}\}_{k_m=1}^{K_m}$ and $\{\phi_{m,L2}^{k_m}\}_{k_m=1}^{K_m}$ at each epoch are then provided to the pseudo-range smoother 126 of the WRS, where $K_m$ represents the total number of GPS satellites observed by the mth WRS. For each GPS satellite observed by the WRS, the pseudo-range smoother uses the corresponding L1 and L2 carrier phase measurements and the corresponding L1 and L2 pseudo-ranges to produce at each epoch a corresponding ionospheric delay estimate $1_m^{k_m}$ and a corresponding smoothed pseudo-range $\rho_m^{k_m}$ from which the ionospheric delay estimate has been removed. This is done using the method described in "GPS Survey", by C. Goad, a chapter in "The Global Positioning System: Theory and Applications", edited by B. Parkinson, J. Spilker, P. Axelrod, and P. Enge, American Institute of Aeronautics and Astronautics, 1995, which is hereby explicitly incorporated by reference. The set of smoothed pseudo-ranges $\{\rho_m^{k_m}\}_{k_m=1}^{K_m}$ at each epoch are sent to the pseudo-range residual estimator 132 and the set of ionospheric delay estimates $\{1_m^{k_m}\}_{k_m=1}^{K_m}$ at each epoch are sent to the WMS 108.

The GPS receiver 116 of each WRS 102 also extracts the navigation data contained by the L1 and L2 GPS signals it receives from each GPS satellite it observes. The navigation data processor 128 is provided with the navigation data for each observed GPS satellite and unpacks from it the GPS satellite's location vector $r^{k_m,B}$ and the difference (or offset) $B^{k_m,B}$ from GPS time of the GPS satellite's clock. Then, for each GPS satellite observed by the WRS, the navigation data processor computes at each epoch a line of sight vector $1_m^{k_m}$ and a nominal range $r^{k_m,B} \cdot 1_m^{k_m}$ from the WRS to the GPS satellite based on the unpacked GPS satellite's location and the known reference station location 138 stored in the memory 130. The set of line of sights $\{1_m^{k_m}\}_{k_m=1}^{K_m}$ are provided to the WMS 108 while the set of computed nominal ranges $\{r^{k,B} \cdot 1_m^{k_m}\}_{k_m=1}^{K_m}$ and the set of unpacked clock differences $\{B^{k_m,B}\}_{k_m=1}^{K_m}$ are provided to the pseudo-range residual estimator 132.

The conventional meteorological sensor 118 of each WRS 102 senses surface pressure, humidity, and/or temperature and provides this sensed meteorological data to the tropospheric correction estimator 130. The tropospheric delay estimator 130 periodically computes at each epoch a tropospheric delay estimate $T_m^{k_m}$ for each of the GPS satellites 106 observed by the WRS in response to the sensed meteorological data and the line of sight to each GPS satellite. This is done using a modified Hopfield method as described in "Analysis of Tropospheric Delay Prediction Models: Comparisons with Ray-Tracing and Implications for GPS Relative Positioning", by H. Janes, R Langley, and S. Newby, Bulletin Geodesique, Vol 65, pp 151–161, 1991, which is hereby incorporated by reference. The set of tropospheric delay estimates $\{T_m^{k_m}\}_{k_m=1}^{K_m}$ are then provided to the pseudo-range residual estimator 132.

Each smoothed pseudo-range $\rho_m^{k_m}$ received at each epoch by the pseudo-range residual estimator 132 may be modeled as:

$$\rho_m^{k_m} = r^{k_m} \cdot 1_m^{k_m} + b_m - B^{k_m} + T_m^{k_m} + v_m^{k_m} \qquad \text{Eq. (1)}$$

where $r^{k_m}$ is a vector that represents the actual location of the kth GPS satellite 106 observed by the WRS, $b_m$ represents the actual difference from GPS time of the clock of the GPS receiver 116 of the mth WRS 102, $B^{k_m}$ represents the actual difference from GPS time of the clock of the kth GPS satellite observed by the mth WRS, and $v_m^{k_m}$ represents the noise associated with the kth GPS satellite and the mth WRS that observes it. For each smoothed pseudo-range $\rho_m^{k_m}$, the pseudo-range residual estimator 132 subtracts the corresponding nominal range $r^{k_m,B} \cdot 1_m^{k_m}$, unpacked clock offset $B^{k_m,B}$, and tropospheric correction $T_m^{k_m}$ to produce a pseudo-range residual (i.e. correction) $\Delta\rho_m^{k_m}$ at each epoch for the error in the smoothed pseudo-range. This pseudo-range residual may be represented as:

$$\Delta\rho_m^{k_m} = \Delta r^{k_m} \cdot 1_m^{k_m} + b_m - \Delta B^{k_m} + v_m^{k_m} \qquad \text{Eq. (2)}$$

where $\Delta r^{k_m} = r^{k_m} - r^{k_m,B}$ and is a vector representing the correction for the ephemeris error of the kth GPS satellite observed by the mth WRS, and $\Delta B^{k_m} = B^{k_m} - B^{k_m,B}$ and represents the correction for the clock error of the kth GPS satellite observed by the mth WRS.

Since the clock difference $b_m$ dominates the expression in Equation (2), the reference station clock steerer 134 averages at each epoch all of the pseudo-range residuals $\{\Delta\rho_m^{k_m}\}_{k_m=1}^{K_m}$ for the GPS satellites observed by the WRS to form a rough estimate $\tilde{b}_m$ of the actual clock difference $b_m$, as is well known by those skilled in the art. The clock difference estimate $\tilde{b}_m$ is subtracted by the pseudo-range residual estimator 132 from each pseudo-range residual $\Delta\rho_m^{k_m}$ to produce an adjusted pseudo-range residual $\Delta\rho_m^{k_m}$ given by:

$$\Delta\rho_m^{k_m} = \Delta r^{k_m} \cdot 1_m^{k_m} + \Delta b_m - \Delta B^{k_m} + v_m^{k_m} \qquad \text{Eq.(3)}$$

where $\Delta b_m = \bar{b}_m - b_m$. The set of pseudo-range residuals $\{\Delta\rho_m^{k_m}\}_{k_m=1}^{K_m}$ are then transmitted to the WMS 108 over one of the data communication links 110 by the data link interface 121. Each data communication link 110 may comprise a conventional modem/telephone line system, an RF or other frequency transmitter/receiver system, a fiber optic cable network, or other suitable transmission system.

Wide Area Master Station (WMS)

Figure 4:
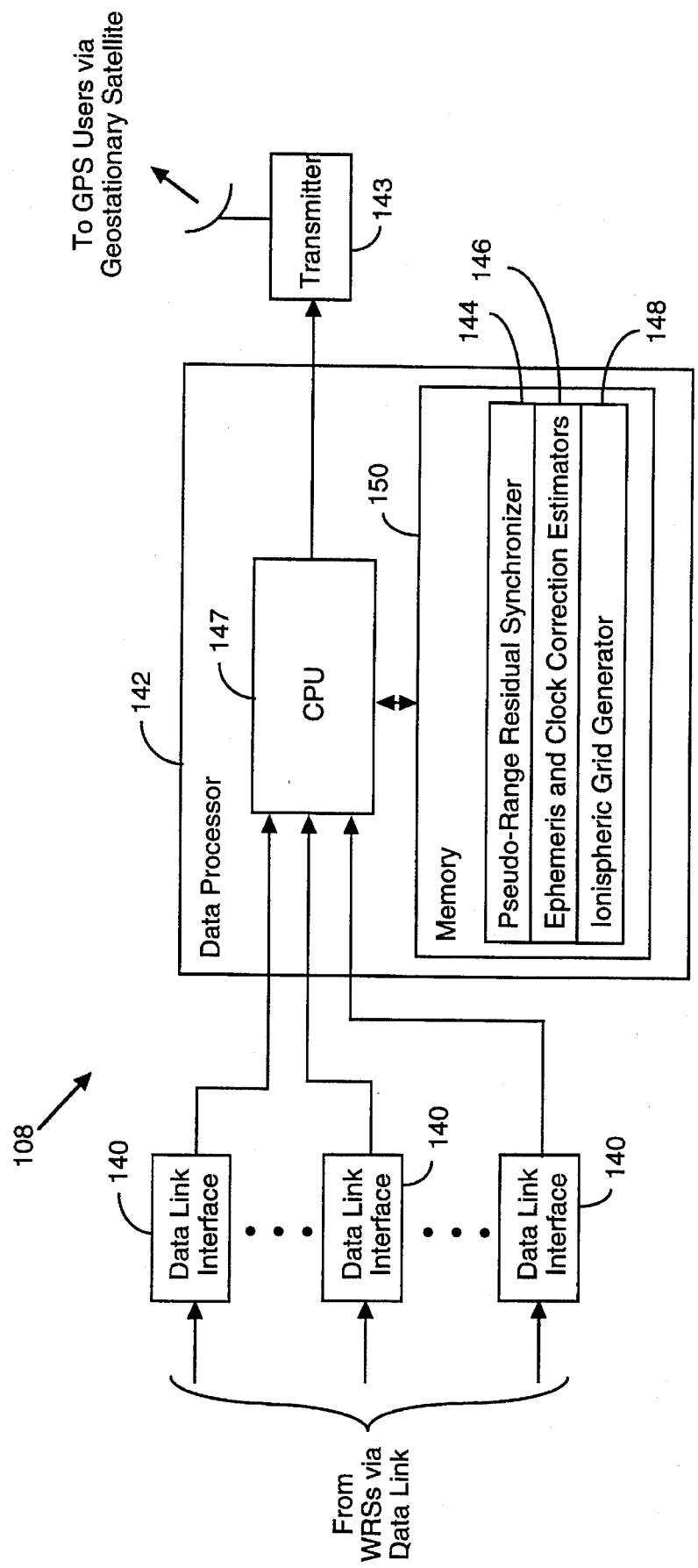
FIG. 4 provides a block diagram of a wide area master station (WMS) used in the WDGPS system of FIG. 1.

Referring to FIG. 4, the WMS 108 includes data link interfaces 140, a data processor 142, and a transmitter 143. The data processor includes a pseudo-range residual synchronizer 144, ephemeris and clock correction estimators 146, and an ionospheric grid generator 148 which are run by the CPU 147 and stored in the memory 150.

Figure 5:
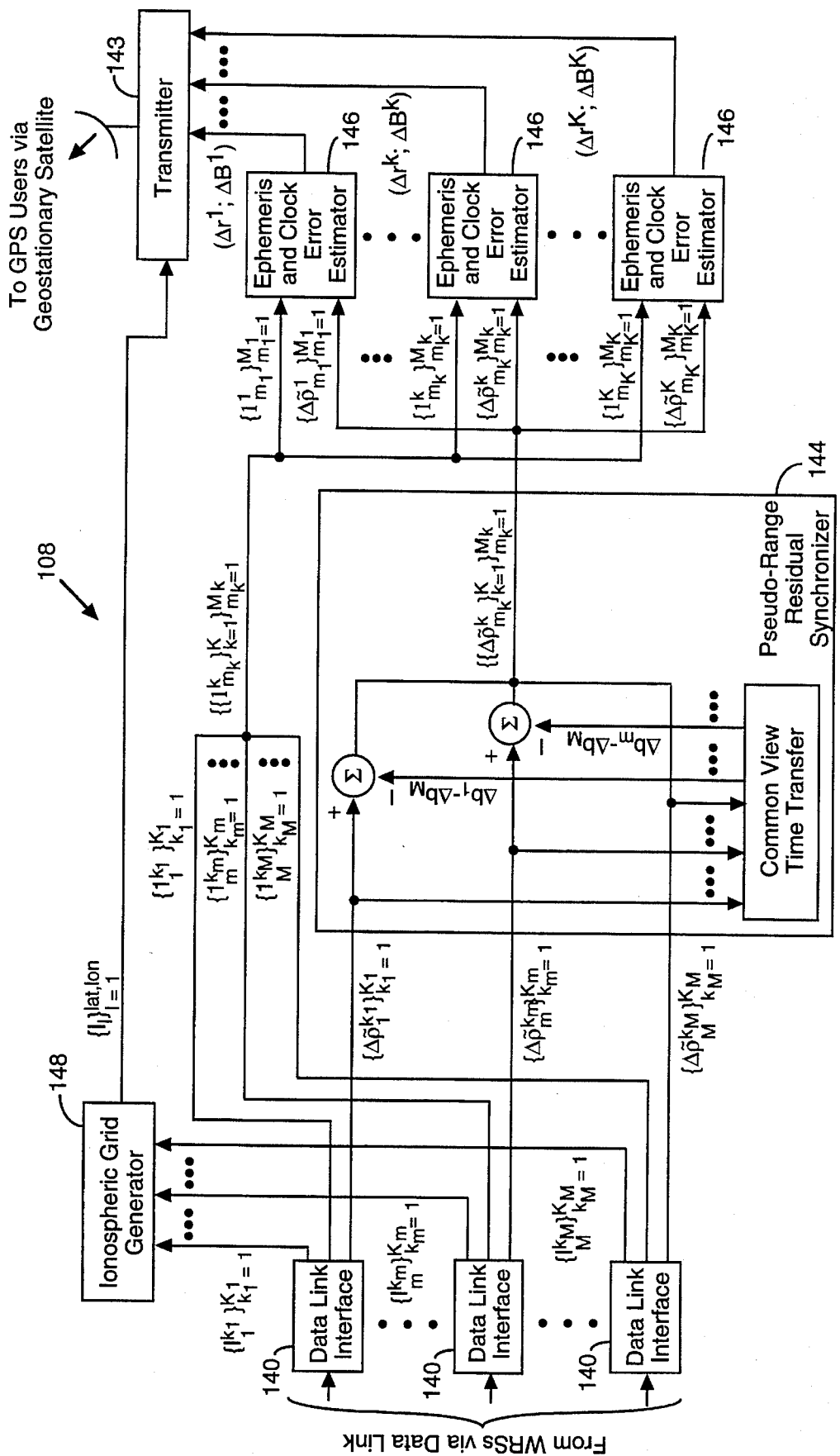
FIG. 5 shows the operation of the WMS of FIG. 4.

Turning to FIGS. 1 and 5, the WMS 108 includes the same number of data link interfaces 140 as there are WRSs 102 in the WDGPS reference system 104. As a result, the interfaces 140 provide the pseudo-range residual synchronizer 144 at each epoch with the pseudo-range residuals $\{\{\Delta\rho_m^{k_m}\}_{k_m=1}^{K_m}\}_{m=1}^{M}$, provide the ionospheric grid generator 148 with the ionospheric delay estimates $\{\{1_m^{k_m}\}_{k_m=1}^{K_m}\}_{m=1}^{M}$, and provide the ephemeris and clock correction estimators 146 with the lines of sight $\{\{1_m^{k_m}\}_{k_m=1}^{K_m}\}_{m=1}^{M}$ (re-phrased as $\{\{1_{m_k}^{k}\}_{k=1}^{K_k}\}_{m_k=1}^{M_k}$, as will be discussed later), where M represents the total number of WRSs.

As those skilled in the art will appreciate, the lines of sight $\{\{1_m^{k_m}\}_{k_m=1}^{K_m}\}_{m=1}^{M}$ could be computed by the WMS 108 rather than the WRSs 102. In this case, the WMS may include a GPS receiver that receives the GPS signals transmitted by the GPS satellites 104 and then removes the navigation data contained in the GPS signals. Or, the navigation data in the GPS signals received by the WRSs could be simply provided to the WMS via the communication links 110. In either case, based on the GPS satellite locations contained in the navigation data of the GPS signals and the known locations of the WRSs which would be stored in the memory 150 of the WMS, the WMS would then compute the lines of sight.

In response to the ionospheric delay estimates $\{\{1_m^{k_m}\}_{k_m=1}^{K_m}\}_{m=1}^{M}$, the ionospheric grid generator 148 produces a grid of ionospheric corrections $\{1_l\}_{l=1}^{lat,lon}$ over the area covered by the GPS satellites 106. This is done in the manner described in "Flight Trials of the Wide-Area Augmentation System (WAAS)", by Walter et. al., Proceedings of the International Technical Meeting of the Satellite Division of the Institute of Navigation, Salt Lake City, September 1994, which is hereby explicitly incorporated by reference. The grid of ionospheric corrections is provided to the user's positioning system 114 in a correction message transmitted by the transmitter 143.

In response to the pseudo-range residuals $\{\{\Delta\rho_m^{k_m}\}_{k_m=1}^{K_m}\}_{m=1}^{M}$, the pseudo-range synchronizer 144 first performs at each epoch a common view time transfer to estimate the differences between the clocks of the WRSs 102 with respect to a master clock. The clock differences are then removed from the pseudo-range residuals so as to synchronize them.

In order to do so, one of the WRSs is designated as a primary WRS and the remaining WRSs are designated as secondary WRSs. For each GPS satellite 106 in common view of the primary WRS and at least one of the secondary WRSs, the pseudo-range residual synchronizer 144 first subtracts at each epoch the pseudo-range residual $\Delta\rho_M^{k_{m,M}}$ computed for it by the primary WRS from each pseudo-range residual $\Delta\rho_m^{k_{m,M}}$ computed for it by those of the secondary WRSs that observe it, where M represents the primary WRS (in addition to representing the number of WRSs) and, for $m \neq M$, $k_{m,M}$ represents the kth of the GPS satellites that is observed by the mth secondary WRS and by the primary WRS. This results in the difference $\Delta_m^{k_{m,M}}$ at each epoch which is given as follows:

$$\Delta_m^{k_{m,M}} = \Delta\rho_M^{k_{m,M}} - \Delta\rho_M^{k_{m,M}} = \Delta r^{k_{m,M}} \cdot (1_m^{k_{m,M}} - 1_M^{k_{m,M}}) + \Delta b_m - \Delta b_M + v_{m,M}^{k_{m,M}} \qquad \text{Eq.(4)}$$

where $v_{m,M}^{k_{m,M}} = v_m^{k_{m,M}} - v_M^{k_{m,M}}$. Assuming that the difference in line of sights $(1_m^{k_{m,M}} - 1_M^{k_{m,M}})$ is small and/or the ephemeris correction $\Delta r^{k_{m,M}}$ is small, then an estimate of the WRS clock error can be made by averaging the difference $\Delta_m^{k_{m,M}}$ as follows:

$$\Delta b_m - \Delta b_M \approx \frac{1}{K_{m,M}} \sum_{k_{mM}=1}^{K_{m,M}} \Delta_{m,M}^{k_{m,M}} \qquad \text{Eq. (5)}$$

where $\Delta b_m - \Delta b_M$ represents the clock difference at each epoch between the primary WRS and the mth secondary WRS and $K_{m,M}$ represents the total number of GPS satellites in common view of the primary WRS and the mth WRS. Moreover, if the clocks of the GPS receivers 116 of the WRSs are high quality clocks, such as rubidium clocks, then the difference $\Delta b_m - \Delta b_M$ can be averaged over time to take advantage of the well behaved drift of the clocks. In this case, the expression in Equation (5) can be re-written as:

$$\Delta b_m - \Delta b_M \approx \frac{1}{K_{m,M}} \sum_{k_{mM}=1}^{K_{m,M}} h(t_j) * \Delta_{m,M}^{k_{m,M}}(t_j) \qquad \text{Eq. (6)}$$

where $h(t_j)$ represents the well known impulse response for a low pass filter.

From the foregoing, it is evident that in order to compute a clock difference $\Delta b_m - \Delta b_M$ at each epoch for each WRS 102, the secondary WRSs must be positioned with respect to the primary WRS so that each secondary WRS will always have at least one GPS satellite in common view with the primary WRS. Preferably, the WRS that is closest to the WMS and most centrally located with respect to the more peripheral WRSs is the primary WRS.

The pseudo-range synchronizer 144 then at each epoch subtracts from the pseudo-range residuals $\{\Delta\rho_m^{k_m}\}_{k_m=1}^{K_m}$ computed by each of the secondary WRSs the corresponding clock difference $\Delta b_m - \Delta b_M$ to produce the pseudo-range residuals $\{\Delta\bar{\rho}_m^{k_m}\}_{k_m=1}^{K_m}$ at each epoch. Thus, the pseudo-range residuals computed by the secondary WRSs $\{\{\Delta\bar{\rho}_m^{k_m}\}_{k_m=1}^{K_m}$ are synchronized with the pseudo-range residuals $\{\Delta\bar{\rho}_M^{k_M}\}_{k_M=1}^{K_M}$ computed by the primary WRS and referenced to the same master clock (i.e., the clock of the primary WRS). As a result, each synchronized pseudo-range residual can now be represented as $\Delta\bar{\rho}_m^{k_m}$ and given by:

$$\Delta\bar{\rho}_m^{k_m} = \Delta r^{k_m} \cdot 1_m^{k_m} + \Delta\ddot{B}^{k_m} + v_m^{k_m} \qquad \text{Eq.(7)}$$

for m=1 to M, and where $\Delta\rho_M^{k_m} = \Delta\bar{\rho}_M^{k_m}$, and $\Delta\tilde{B}^{k_m} = \Delta b_M - \Delta B^{k_m}$ and represents the clock correction for the kth GPS satellite observed by the mth WRS synchronized to the clock of the primary WRS.

Furthermore, Equation (7) can be re-written as follows:

$$\Delta \overline{\rho}_{m_k}{}^k = \Delta r^k \cdot 1_{m_k}{}^k + \Delta \tilde{B}^k + v_{m_k}{}^k \quad \text{Eq. (8)}$$

where k represents the kth of all of the GPS satellites 106 observed by the entire network of WRSs 102 and $m_k$ represents the mth of those of the WRSs that observe the kth GPS satellite. The set of synchronized pseudo-range residuals $\{\{\Delta \overline{\rho}_{m_k}{}^k\}_{k=1}^K\}_{m_k=1}^{M_k}$ and the corresponding set of lines of sight $\{\{1_{m_k}{}^k\}_{k=1}^K\}_{m_k=1}^{M_k}$ (re-phrased to correspond with the synchronized pseudo-range residuals) are then provided to the ephemeris and clock correction estimators 146 of the WMS 108, where $M_k$ represents the total number of WRS that observe the kth GPS satellite.

Since the clock differences of the WRSs 102 have been removed from the set of synchronized pseudo-range residuals $\{\{\Delta \overline{\rho}_{m_k}{}^k\}_{k=1}^K\}_{m_k=1}^{M_k}$, the WMS 108 can employ an ephemeris and clock correction estimator 146 for each of the GPS satellites 106 observed by the WRSs. Each ephemeris and clock correction estimator then computes at each epoch the ephemeris correction vector $\Delta r^k$ and the clock correction $\Delta \tilde{B}^k$ for the corresponding GPS satellite in response to the lines of sight $\{1_{m_k}{}^k\}_{m_k=1}^{M_k}$ to the corresponding GPS satellite and the synchronized pseudo-range residuals $\{\Delta \overline{\rho}_{m_k}{}^k\}_{m_k=1}^{M_k}$ for the corresponding GPS satellite, independent of the synchronized pseudo-range residuals for the other GPS satellites. As will be evident from the following discussion, by employing separate ephemeris and clock correction estimators 146, the computational complexity of a single large estimator is avoided.

Four Dimensional Estimators

In one embodiment, each ephemeris and clock correction estimator 146 solves for the four dimensional state vector $[\Delta r^k, \Delta \tilde{B}^k]^T$ based on the following matrix system:

$$\begin{bmatrix} \Delta \overline{\rho}_{1_k}^k \\ \cdot \\ \cdot \\ \cdot \\ \Delta \overline{\rho}_{m_k}^k \\ \cdot \\ \cdot \\ \cdot \\ \Delta \overline{\rho}_{M_k}^k \end{bmatrix} = \begin{bmatrix} (1_{1_k}^k)^T & -1 \\ \cdot & \cdot \\ \cdot & \cdot \\ \cdot & \cdot \\ (1_{m_k}^k)^T & -1 \\ \cdot & \cdot \\ \cdot & \cdot \\ \cdot & \cdot \\ (1_{M_k}^k)^T & -1 \end{bmatrix} \begin{bmatrix} \Delta r^k \\ \Delta \tilde{B}^k \end{bmatrix} \quad \text{Eq. (9)}$$

The system of Equation (9) can be more compactly re-written as follows:

$$\Delta \rho^k = G_W X^k \quad \text{Eq. (10)}$$

where $\Delta \rho^k$ is the vector containing each synchronized pseudo-range residual $\Delta \overline{\rho}_m{}^k$ computed by the WRSs 102 for the kth GPS satellite 106, $x^k$ is the four dimensional state vector containing the ephemeris and clock corrections $\Delta r^k$ and $\Delta \tilde{B}^k$ for the kth GPS satellite, and $G_W$ is the design matrix that contains, for each WRS that observes the kth GPS satellite, a line of sight from it to the kth GPS satellite and a matrix element (i.e., −1) that indicates that the corresponding synchronized pseudo-range residual in the vector $\Delta \rho^k$ should be adjusted by the clock correction $\Delta \tilde{B}^k$ for the kth GPS satellite.

When the WDGPS reference system 104 includes at least four WRSs 102'(i.e., the primary WRS and at least three secondary WRSs) and the kth GPS satellite 106 is observed by exactly four of these WRSs, then the system of Equation (10) is exactly specified. Furthermore, when the WDGPS reference system 104 includes more than four WRSs 102 and the kth GPS satellite 106 is observed by more than four of these WRSs, then the system of Equation (10) is over specified. In either case, the corresponding estimator 146 first computes a pseudo-inverse $(G_W{}^T G_W)^{-1} G_W{}^T$ of the design matrix $G_W$. In the case where the corresponding GPS satellite is observed by exactly four of the WRSs, the pseudo-inverse reduces to the inverse $G_W{}^{-1}$ of the design matrix $G_W$. The estimator then computes a minimum mean square error solution for the state vector $x^k$ as follows:

$$X^k = (G_W{}^T G_W)^{-1} G_W{}^T \Delta \rho^k \quad \text{Eq. (11)}$$

Moreover, the system of Equation (10) is under specified when the kth GPS satellite 106 is observed by less than four WRSs 102, regardless of whether the WDGPS reference system 104 includes less than four WRSs (i.e., the primary WRS and no more than two secondary WRSs) or at least four WRSs. In this situation, the corresponding estimator 146 computes a pseudo-inverse $G_W{}^T (G_W G_W{}^T)^{-1}$ of the design matrix $G_W$ and then computes a minimum norm solution for the state vector $x^k$ as follows:

$$x^k = G_W{}^T (G_W G_W{}^T)^{-1} \Delta \rho^k \quad \text{Eq. (12)}$$

The minimum norm solution has the minimum length or energy among all of the satisfactory solutions.

The set of computed ephemeris and clock corrections $\{\Delta r^k; \Delta \tilde{B}^k\}_{k=1}^K$ for the GPS satellites observed by the WRSs 102 are then provided to the transmitter 144. The transmitter transmits them as corrections to the user's GPS positioning system 114 via the geostationary satellite 112 or other suitable broadcast facility so that the user's positioning system can compute an accurate position fix. Alternatively, as those skilled in the art will appreciate, the computed ephemeris and clock corrections may be transmitted directly to the user's positioning system by the transmitter 143.

Figure 6:
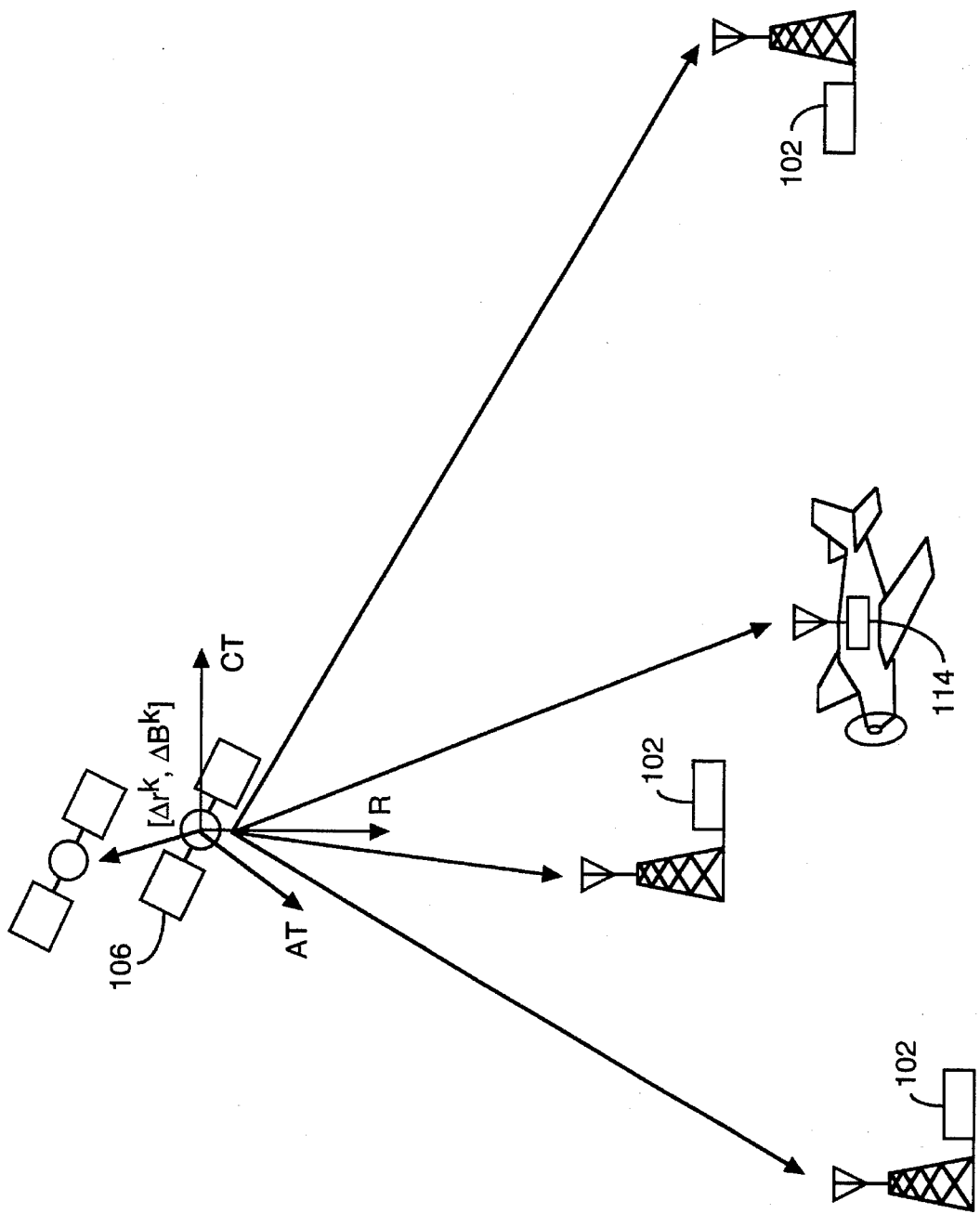
FIG. 6 demonstrates the situation where a GPS satellite is observed by only three WRSs in the WDGPS system of FIG. 1.

FIGS. 6 illustrates the situations when the kth GPS satellite 106 is observed by only three WRSs 102 and the system of Equation (10) is under specified. Since the kth GPS satellite 106 is observed by only three WRSs, this geometry does not provide leverage for precisely observing each of the radial (i.e., orbit radius), along track (along satellite velocity), and cross track (i.e., orthogonal to radial and along track) components of the ephemeris error of the GPS satellite and the clock error of the GPS satellite. However, when the user's positioning system 114 is between the three WRSs or adjacent to one of the three WRSs, the minimum norm solution of Equation (12) does provide accurate ephemeris and clock corrections $\Delta r^k$ and $\Delta \tilde{B}^k$ for the ephemeris and clock errors since the components of these errors that effect the user's positioning system effect the three WRSs substantially in the same manner.

Figure 7:
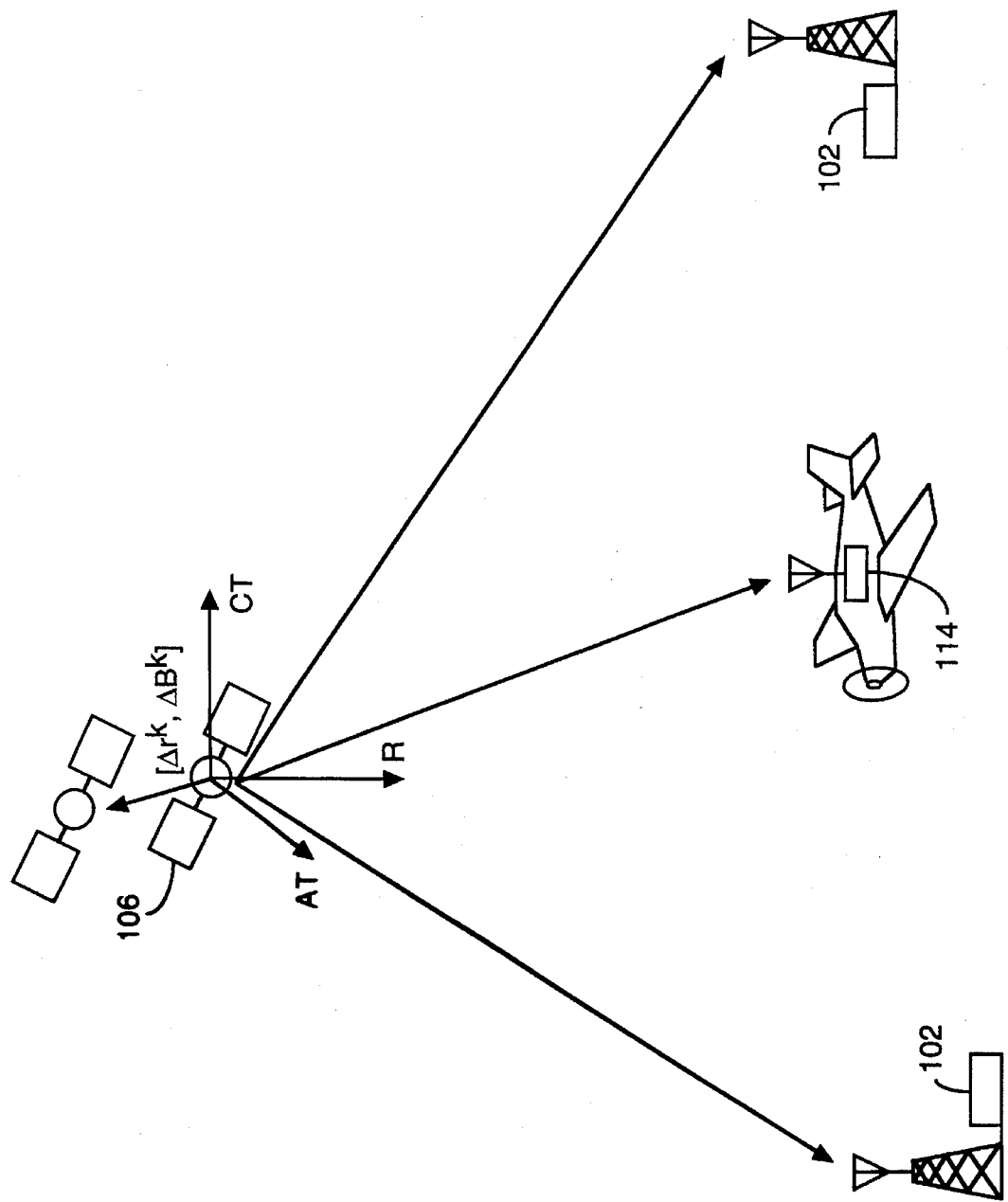
FIG. 7 demonstrates the situation where a GPS satellite is observed by only two WRSs in the WDGPS system of FIG. 1.

FIG. 7 demonstrates the case when the kth GPS satellite 106 is observed by only two WRSs 102 and the system of Equation (10) is under specified. Similar to the situation described for FIG. 6, although this geometry does not provide leverage for precisely observing each of the components of the ephemeris and clock errors, the minimum norm solution of Equation (12) does provide accurate ephemeris and clock corrections $\Delta r^k$ and $\Delta \tilde{B}^k$ for when the user's positioning system 114 is between the two WRSs or adjacent to one of the WRSs. As in the situation of FIG. 6, this is due to the fact that the components of the ephemeris and clock errors that effect the user's positioning system effect the two WRSs substantially in the same manner.

Figure 8:
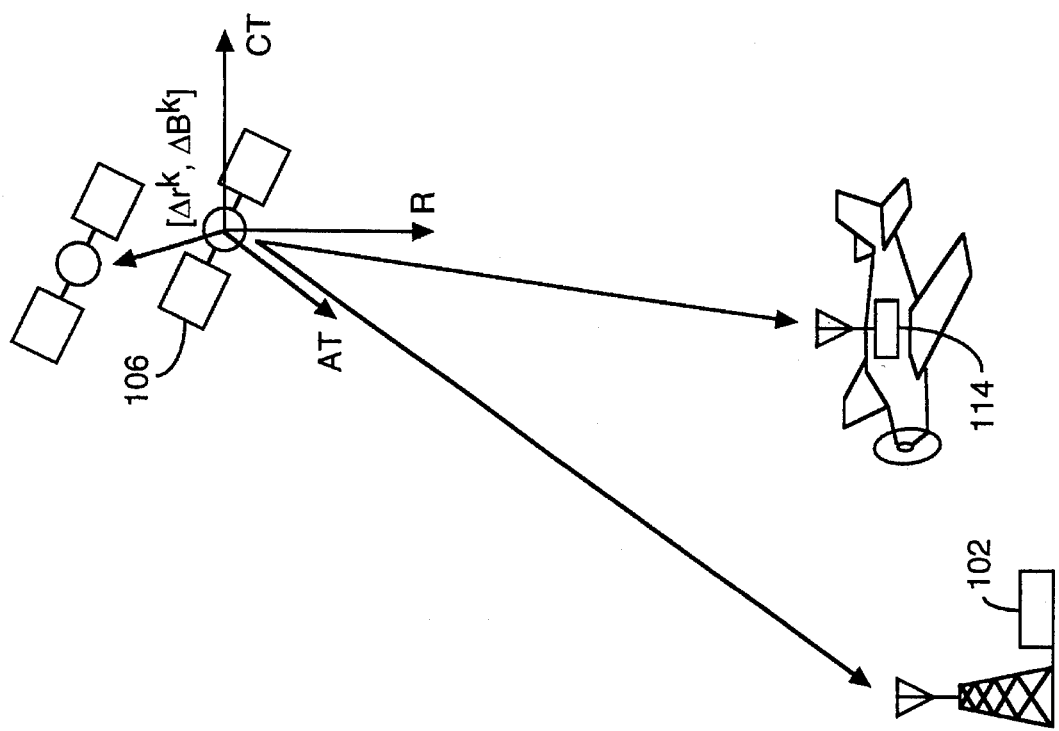
FIG. 8 demonstrates the situation where a GPS satellite is observed by only one WRSs in the WDGPS system of FIG. 1.

Similarly, FIG. 8 shows the situation when the kth GPS satellite 106 is observed by only one WRS 102 and the system of Equation (10) is under specified. This geometry also does not provide the leverage for accurately observing the components of the ephemeris and clock errors. But, when the user's positioning system 114 is adjacent to the WRS, the minimum norm solution of Equation (12) provides accurate ephemeris and clock corrections $\Delta r^k$ and $\Delta \tilde{B}^k$ because the components of the ephemeris and clock errors that effect the user's positioning system effect the WRS in substantially the same manner.

From the foregoing, it is evident that the WDGPS reference system 104 is capable of estimating applicable ephemeris and clock errors for any GPS satellite in view of at least one of the WRSs 102, provided that the user's positioning system 114 is between WRSs or adjacent to a WRSs. As a result, the WDGPS reference system can provide to users accurate and valid ephemeris and clock corrections for each GPS satellite from the time that it is first observed by one of the WRSs (i.e., appears on the horizon) until the time that it is no longer observed by any of the WRSs (i.e., disappears below the horizon).

However, in this embodiment, even though the four dimensional minimum norm solution for the state vector $x^k$ always generates corrections which are valid for users in between or adjacent the WRSs 102, the high frequency energy in the clock correction $\Delta B_k$ (resulting from the high frequency energy in the clock error due to selective availability) splatters into the ephemeris corrections $\Delta r^k$. As a consequence, the ephemeris corrections $\{\Delta r^k\}_{k=1}^K$ must be transmitted by the WMS 108 in the correction message to users as frequently (i.e., at each epoch) as the clock corrections $\{\Delta \tilde{B}^k\}_{k=1}^K$. This may be undesirable in an operational WDGPS reference system where the broadcast bandwidth is severely limited and only allows the clock corrections to be sent frequently. In such a case, three dimensional ephemeris and clock correction estimators may be used instead.

Three Dimensional Estimators

In this embodiment, each ephemeris and clock correction estimator 146 first subtracts each synchronized pseudo-range residual $\Delta \bar{\rho}_{m_k}^k$ for the corresponding GPS satellite computed by the secondary WRSs from the synchronized pseudo-range residual $\Delta \bar{\rho}_{M_k}^k$ for the corresponding GPS satellite computed by the primary WRS, where $M_k$ also represents the primary WRS (in addition to representing the total number of WRSs that observe the kth GPS satellite). Each difference $\Delta_{m_k M_k}^k$ can be expressed as:

$$\Delta_{m_k M_k}^k = \Delta \bar{\rho}_{m_k}^k - \Delta \bar{\rho}_{M_k}^k = \Delta r_{m_k M_k}^k \cdot (1_{m_k}^k - 1_{M_k}^k) + v_{m_k M_k}^k \quad \text{Eq. (13)}$$

where $v_{m_k M_k}^k = v_{m_k}^k - v_{M_k}^k$. This is done in order to separate the computation of the clock correction $\Delta \tilde{B}^k$ from the computation of the ephemeris correction $\Delta r^k$ so that the high frequency energy of the clock correction does not splatter into the ephemeris correction.

Each estimator then solves the three dimensional ephemeris correction vector $\Delta r^k$ based on the following matrix system:

$$\begin{bmatrix} \Delta_{1_k, M_k}^k \\ \vdots \\ \Delta_{m_k, M_k}^k \\ \vdots \\ \Delta_{M_k-1, M_k}^k \end{bmatrix} = \begin{bmatrix} (1_{1_k}^k - 1_{M_k}^k)^T \\ \vdots \\ (1_{m_k}^k - 1_{M_k}^k)^T \\ \vdots \\ (1_{M_k-1}^k - 1_{M_k}^k)^T \end{bmatrix} [\Delta r^k] \quad \text{Eq. (14)}$$

Similar to the system of Equation (9), the system of Equation (14) can be more compactly re-written as:

$$\Delta^k = G_W \Delta r^k \quad \text{Eq. (15)}$$

where $\Delta^k$ is a vector containing each computed difference $\Delta_{m_k, M_k}^k$ and $G_W$ is the matrix that contains, for each secondary WRS that observes the kth GPS satellite, the difference between the line of sight $1_{m_k}^k$ from the corresponding secondary reference station to the kth GPS satellite and the line of sight $1_{M_k}^k$ from the primary reference station to the kth GPS satellite.

As with the system of Equation (10), the system of Equation (15) is exactly specified when the WDGPS reference system 104 includes at least four WRSs 102 (i.e., the primary WRS and at least three secondary WRSs) and the kth GPS satellite 106 is observed by exactly four of these WRSs. And, the system of Equation (15) is over specified when the WDGPS reference system includes more than four WRSs 102 and when the kth GPS satellite 106 is observed by more than four of these WRSs. The corresponding estimator 146 in this case computes a three dimensional minimum mean square error solution for the state vector $\Delta r^k$ as follows:

$$\Delta r^k = (G_W^T G_W)^{-1} G_W^T \Delta^k \quad \text{Eq.(16)}$$

In addition, the system of Equation (15) is under specified if the kth GPS satellite 106 is observed by less than four WRSs 102 in either situation where the WDGPS reference system 104 includes less than four WRS (i.e., the primary WRS and no more than two secondary WRSs) or at least four WRSs. In this case, the corresponding estimator 146 computes a three dimensional minimum norm solution for the state vector $\Delta r^k$ as follows:

$$\Delta r^k = G_W^T (G_W G_W^T)^{-1} \Delta^k \quad \text{Eq. (17)}$$

For each of the situations described above, after computing the ephemeris correction $\Delta r^k$, each estimator 146 then computes the clock correction $\Delta \tilde{B}^k$ according to:

$$\Delta \tilde{B}^k = \frac{1}{M_k} \sum_{m_k=1}^{M_k} \Delta \bar{\rho}_{m_k}^k - \Delta r^k \cdot 1_{m_k}^k \quad \text{Eq. (18)}$$

The set of ephemeris and clock corrections $\{\Delta r^k; \Delta \tilde{B}^k\}_{k=1}^K$ computed by the estimators 146 are then provided to the transmitter 144 for transmission as ephemeris and clock corrections.

As was alluded to earlier, the three dimensional estimators 146 prevent the high frequency energy in the clock correction $\Delta \tilde{B}^k$ from splattering into the computed ephemeris corrections $\Delta r^k$. As a result, the set of computed ephemeris corrections $\{\Delta r^k\}_{k=1}^K$ need not be transmitted as often as the set of computed clock corrections $\{\Delta \tilde{B}^k\}_{k=1}^K$.

However, since newly rising GPS satellites are important to GPS users, a disadvantage to this three dimensional approach is that corrections for newly rising GPS satellites cannot be computed until the GPS satellite is viewed by the primary WRS and at least one secondary WRS. For this reason, the estimators 146 may utilize the three dimensional approach for each GPS satellite that is observed by the primary WRS and at least one secondary WRS and utilize the four dimensional approach for each GPS satellite that is observed by at least one WRS but is not observed by the primary WRS and at least one secondary WRS.

User's GPS Positioning Unit

Referring to FIG. 1, since the WDGPS reference system 104 is capable of estimating the ephemeris and clock corrections for any GPS satellite in view of at least one of the WRSs 102, the user's GPS positioning unit 114 can make accurate position fixes using the ephemeris and clock corrections transmitted by the WMS 108.

Figure 9:
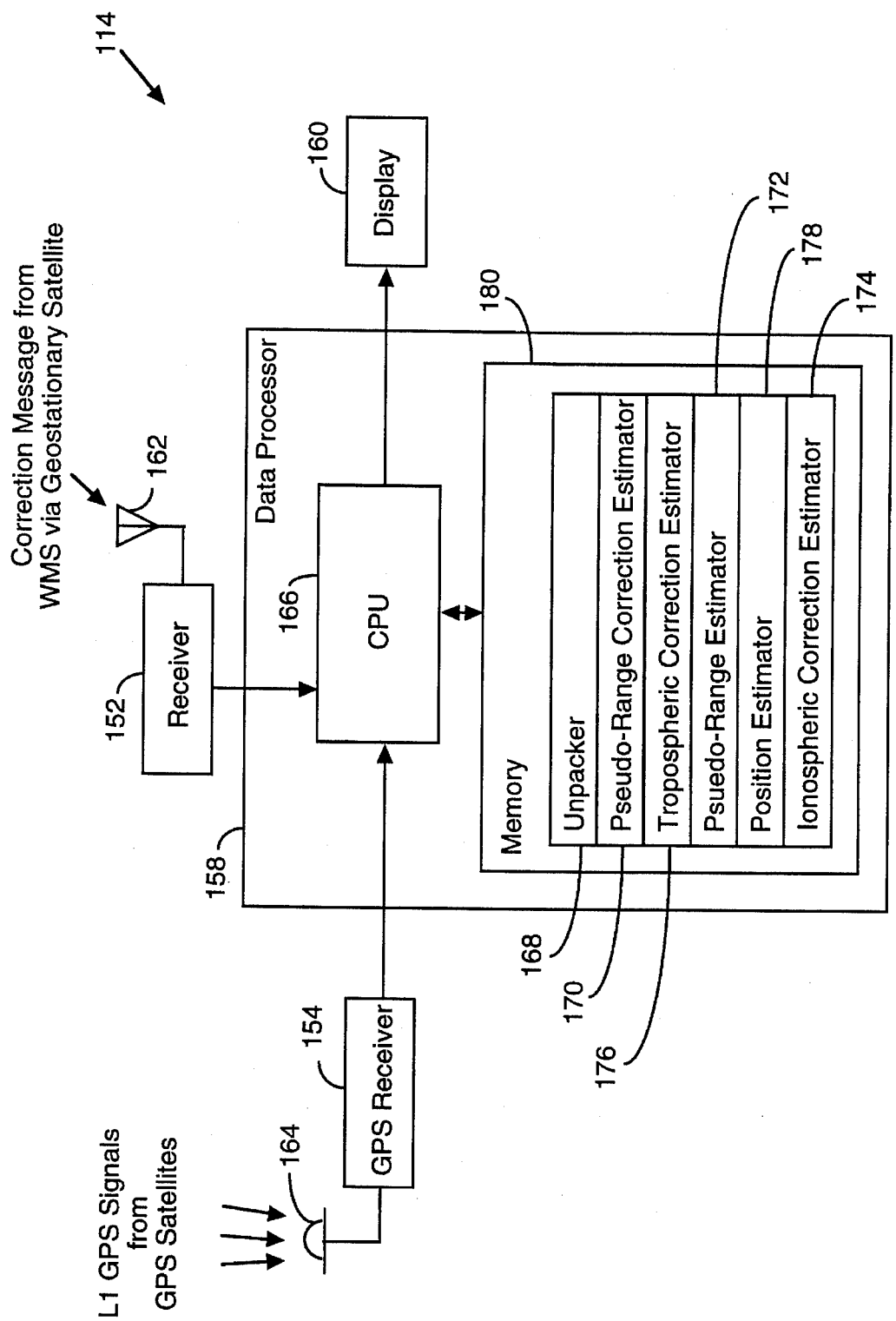
FIG. 9 provides a block diagram of a user's GPS positioning unit used in the WDGPS system of FIG. 1.

As shown in FIG. 9, the user's positioning unit 114 includes a correction message receiver 152, a conventional L1 frequency GPS receiver 154, a data processor 158, and a display 160. The data processor includes a CPU 166 that runs the correction message unpacker 168, the pseudo-range correction estimator 170, the pseudo-range estimator 172, the ionospheric correction estimator 174, the tropospheric correction estimator 176, and the position estimator 178 which are all stored in the memory 180. The receiver 152 includes an antenna 162 for receiving the correction message transmitted by the WMS 108 and re-transmitted by the geostationary satellite 112. The GPS receiver 154 includes a conventional GPS antenna 164 for receiving L1 GPS signals from GPS satellites in its view. Alternatively, the correction message receiver 152 and the GPS receiver 154 may be integrated as a single unit for receiving both the correction message and the GPS signals.

Figure 10:
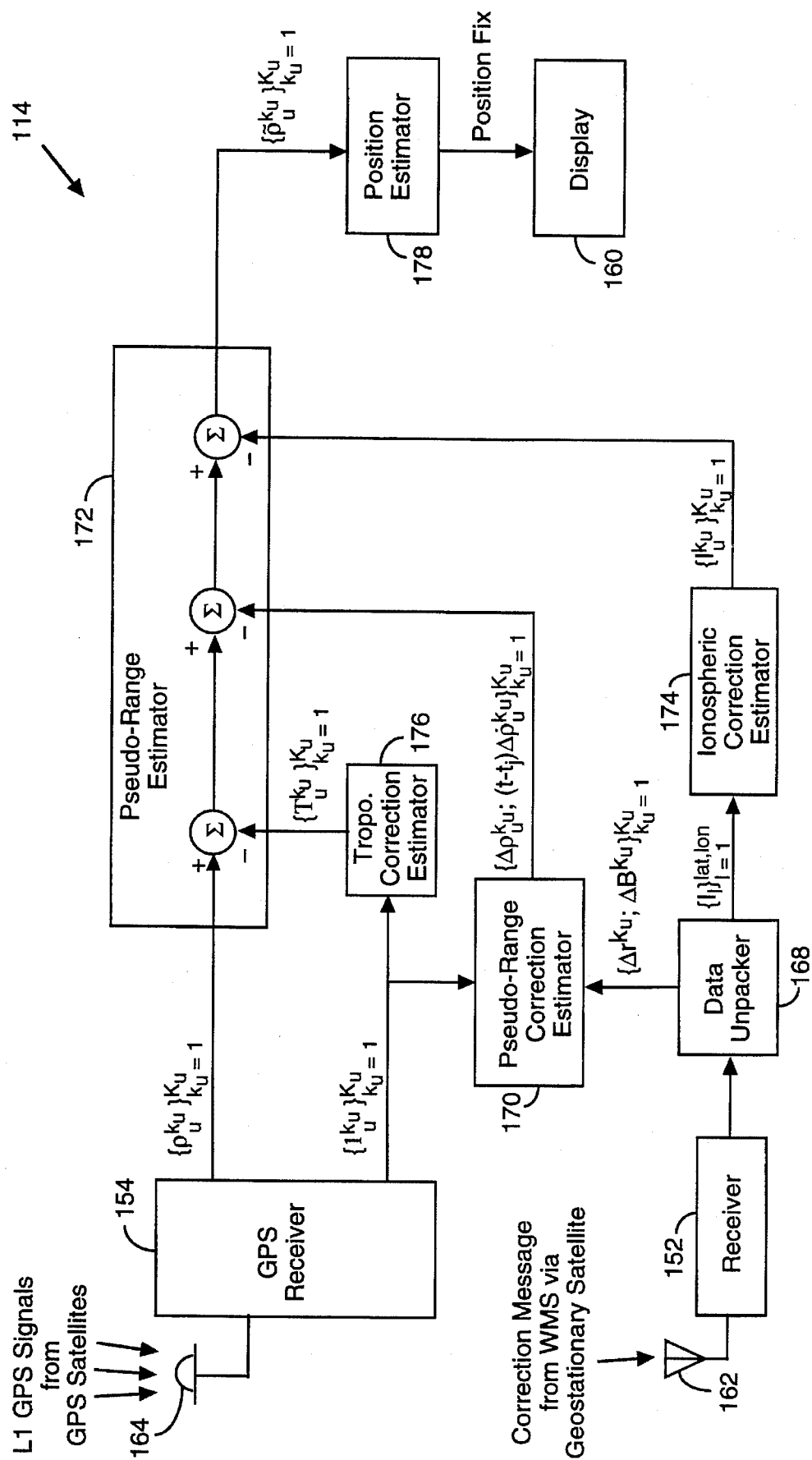
FIG. 10 shows the operation of the user's GPS positioning unit of FIG. 9.

Turning to FIGS. 1 and 10, the GPS antenna 164 of the GPS receiver 154 receives an L1 GPS signal from each of the GPS satellites 106 that is in view and the GPS receiver 154 in response observes each of these GPS satellites. For each observed GPS satellite, the GPS receiver 154 computes at each epoch a pseudo-range $\rho_u^{k_u}$ from the user's positioning unit 114 to the corresponding GPS satellite based on the L1/CA code received from the GPS satellite, where $k_u$ represents the kth GPS satellite observed by the user's positioning unit. At each epoch, the GPS receiver 154 also computes a line of sight $1_u^{k_u}$ from the user's positioning unit to each observed GPS satellite The set of pseudo-ranges $\{\rho_u^{k_u}\}_{k_u=1}^{K_u}$ at each epoch are then provided to the pseudo-range estimator 172 of the user's positioning unit and the set of lines of sight $\{1_u^{k_u}\}_{k_u=1}^{K_u}$ at each epoch are provided to the tropospheric correction estimator 176, where $K_u$ represents the total number of GPS satellites observed by the user's positioning unit.

The tropospheric correction estimator 176 computes a tropospheric correction $T_u^{k_u}$ for each of the GPS satellites 106 observed by the user's positioning unit in response to the line of sight $1_u^{k_u}$ to each GPS satellite. This is done according to the modified Hopfield method discussed earlier. The set of tropospheric corrections $\{T_u^{k_u}\}_{k_u=1}^{K_u}$ are then provided to the pseudo-range estimator 172.

Alternatively, the user's positioning system could include a meteorological sensor to sense surface pressure, humidity, and/or temperature. In response to this meteorological data, the tropospheric correction estimator 176 would compute the tropospheric corrections $\{T_u^{k_u}\}_{k_u=1}^{K_u}$.

The antenna 162 of the receiver 152 receives the correction message transmitted by the WMS 108 and the receiver in response provides the correction message to the correction message unpacker 168. The correction message unpacker unpacks the sets of ephemeris and clock corrections $\{\Delta r^k; \Delta \tilde{B}^k\}_{k=1}^{K}$ and sends them to the pseudo-range estimator 172. In addition, it unpacks the grid of ionospheric corrections $\{1_l\}_{l=1}^{lat,lon}$ and sends them to the ionospheric delay estimator 174.

In response to the grid of ionospheric corrections $\{1_l\}_{l=1}^{lat,lon}$, the ionospheric delay estimator computes an ionospheric correction $1_u^{k_u}$ for each GPS satellite observed by the user's positioning unit. The set of ionospheric corrections $\{1_u^{k_u}\}_{k_u=1}^{K_u}$ are provided to the pseudo-range estimator 172.

Alternatively, the user's positioning system could use a dual frequency GPS receiver to receive L1 and L2 GPS signals. In this case, the dual frequency GPS receiver could compute the ionospheric corrections directly without requiring the grid of ionospheric corrections transmitted by the WMS 108 to compute these corrections.

In response to the unpacked ephemeris and clock corrections $\Delta r^{k_u}$ and $\Delta \tilde{B}^{k_u}$ for each GPS satellite observed by the user's positioning system, the pseudo-range correction estimator 172 computes at each epoch a pseudo-range correction $\Delta \rho_u^{k_u}$ for the corresponding GPS satellite according to:

$$\Delta \rho_u^{k_u} = \Delta r_u^{k_u} \cdot 1_u^{k_u} - \Delta \tilde{B}^{k_u} \qquad \text{Eq. (19)}$$

and computes at each epoch the term $(t-t_j)\Delta\dot{\rho}_u^{k_u}$, where $\Delta\dot{\rho}_u^{k_u}$ is the pseudo-range correction velocity for the corresponding GPS satellite computed by differencing the computed pseudo-range corrections from the last two epochs as follows:

$$\Delta\dot{\rho}_u^{k_u} = \frac{\Delta\rho_u^{k_u}(t_j) - \Delta\rho_u^{k_u}(t_{j-1})}{t_j - t_{j-1}} \qquad \text{Eq. (20)}$$

Each computed pseudo-range correction $\Delta\rho_u^{k_u}$, term $(t-t_j)\Delta\dot{\rho}^k$, tropospheric delay estimate $T_u^{k_u}$, and ionospheric correction $1_u^{k_u}$ is subtracted from the corresponding pseudo-range $\rho_u^{k_u}$ by the pseudo-range estimator 172 to produce the corrected pseudo-range $\rho_u^{k_u}$ given by:

$$\rho_u^{k_u} = \rho_u^{k_u} - \Delta\rho_u^{k_u} - (t-t_j)\Delta\dot{\rho}_u^{k_u} - 1_u^{k_u} - T_u^{k_u} \qquad \text{Eq. (21)}$$

The set of corrected pseudo-ranges $\{\rho_u^{k_u}\}_{k_u=1}^{K_u}$ are then provided to the position estimator 178. The position estimator computes in response a position fix for the user's positioning unit 114 according to well known techniques. The computed position fix is provided to the display 160 which then displays the position fix for the user.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A GPS reference system for providing ephemeris and/or clock corrections for GPS satellites to users at measurement epochs of the GPS reference system, the GPS reference system comprising:

a network of reference stations, each of the reference stations receiving GPS signals from those of the GPS satellites it observes and computing in response at each of the measurement epochs a pseudo-range residual for each of the GPS satellites it observes at the measurement epoch; and a master station in communication with the reference stations to receive the computed pseudo-range residuals at each of the measurement epochs, the master station comprising:

a pseudo-range residual synchronizer to remove at each of the measurement epochs clock differences between the reference stations from the received pseudo-range residuals at the measurement epoch so as to synchronize them in time;

for each of the GPS satellites observed at each of the measurement Epochs by at least one of the reference stations, a corresponding, independent ephemeris and clock correction estimator to compute at the measurement epoch an ephemeris correction and a clock correction for the corresponding GPS satellite in response to each of the synchronized pseudo-range residuals at the measurement for the corresponding GPS satellite and independent of the synchronized pseudo-range residuals at the measurement for the other GPS satellites observed by the reference stations; and a transmitter to transmit to users at each of the measurement epochs the computed ephemeris and/or clock corrections for each of the GPS satellites observed at the measurement epoch by at least one of the reference stations;

wherein, for at least a subset of the measurement epochs, at least a subset of the GPS satellites for which the ephemeris and/or clock corrections are transmitted are observed by at least one but no more than three of the reference stations such that the transmitted ephemeris and/or clock corrections for each of the at least subset of GPS satellites at each of the at least subset of measurement epochs are computed in response to at least one but no more than three synchronized pseudo-range residuals for the GPS satellite at the measurement epoch.

2. A GPS reference system as recited in claim 1 wherein the network of reference stations comprises no more than three reference stations.

3. A GPS reference system as recited in claim 1 wherein the network of reference stations comprises at least four reference stations.

4. A GPS reference system as recited in claim 1 wherein:

the network of reference stations comprises no more than three reference stations;

each of the ephemeris and clock correction estimators computes at each of the measurement epochs the ephemeris and clock corrections for the corresponding GPS satellite when it is observed at the measurement epoch by at least one of the reference stations in accordance with:

$$x^k = G_W^T (G_W G_W^T)^{-1} \Delta \rho^k$$

where:

k represents the corresponding GPS satellite;

$x^k$ is a state vector containing the ephemeris and clock corrections at the measurement epoch for the corresponding GPS satellite;

$\Delta \rho^k$ is a vector containing, for each of the reference stations that observes the corresponding GPS satellite at the measurement epoch, the corresponding synchronized pseudo-range residual at the measurement epoch for the corresponding GPS satellite; and $G_W$ is a matrix containing, for each of the reference stations that observes the corresponding GPS satellite at the measurement epoch, a line of sight from the reference station to the corresponding GPS satellite and an element that indicates that the corresponding synchronized pseudo-range residual in the vector $\Delta \rho^k$ should be adjusted by the clock correction in the state vector $x^k$ for the corresponding GPS satellite.

5. A GPS reference system as recited in claim 1 wherein:

the network of reference stations comprises at least four reference stations;

each of the ephemeris and clock correction estimators computes at each of the measurement epochs the ephemeris and clock corrections for the corresponding GPS satellite when it is observed at the measurement epoch by at least one but no more than three of the reference stations in accordance with:

$$x^k = G_W^T (G_W G_W^T)^{-1} \Delta \rho^k$$

and when it is observed at the measurement epoch by at least four of the reference stations in accordance with:

$$x^k = (G_W^T G_W)^{-1} G_W^T \Delta \rho^k$$

where:

k represents the corresponding GPS satellite;

$x^k$ is a state vector containing the ephemeris and clock corrections at the measurement epoch for the corresponding GPS satellite;

$\Delta \rho^k$ is a vector containing, for each of the reference stations that observes the corresponding GPS satellite at the measurement epoch, the corresponding synchronized pseudo-range residual at the measurement epoch for the corresponding GPS satellite; and $G_W$ is a matrix containing, for each of the reference stations that observes the corresponding GPS satellite at the measurement epoch, a line of sight from the reference station to the corresponding GPS satellite and an element that indicates that the corresponding synchronized pseudo-range residual in the vector $\Delta \rho^k$ should be adjusted by the clock correction in the state vector $x^k$ for the corresponding GPS satellite.

6. A GPS reference system for providing ephemeris and/or clock corrections for GPS satellites to users at measurement epochs of the GPS reference system, the GPS reference system comprising:

a network of reference stations including a primary reference station and secondary reference stations, each of the reference stations receiving GPS signals from those of the GPS satellites it observes and computing in response at each of the measurement epochs a pseudo-range residual for each of the GPS satellites it observes at the measurement epoch, each of the secondary reference stations positioned with respect to the primary reference station such that at least one of the GPS satellites it observes at each of the measurement epochs is simultaneously observed by the primary reference station; and a master station in communication with the reference stations to receive the computed pseudo-range residuals at each of the measurement epochs, the master station comprising:

a pseudo-range residual synchronizer remove at each of the measurement epochs the clock differences from the received pseudo-range residuals at the measurement epoch so as to synchronize them in time in response to the received pseudo-range residuals at the measurement for each of the GPS satellites that is simultaneously observed at the measurement epoch by the primary reference station and at least one of the secondary reference stations;

for each of the GPS satellites observed at each of the measurements epoch by the primary reference station and at least one of the secondary reference stations, a corresponding, independent ephemeris and clock correction estimator to compute at the measurement epoch an ephemeris correction and a clock correction for the corresponding GPS satellite in response to each of the synchronized pseudo-range residuals at the measurement epoch for the corresponding GPS satellite and independent of the synchronized pseudo-range residuals at the measurement epoch for the other GPS satellites observed by the reference stations; and a transmitter to transmit to users at each of the measurement epochs the computed ephemeris and/or clock corrections for each of the GPS satellites observed at the measurement epoch by the primary reference station and at least one of the secondary reference stations;

wherein, for at least a subset of the measurement epochs, at least a subset of the GPS satellites for which the ephemeris and/or clock corrections are transmitted are observed by the primary reference station and at least one but no more than two of the secondary reference stations such that the transmitted ephemeris and/or clock corrections for each of the at least subset of GPS satellites at each of the at least subset of measurement epochs are computed in response to at least two but no more than three synchronized pseudo-range residuals for the GPS satellite at the measurement epoch.

7. A GPS reference system as recited in claim 6 wherein the network of reference stations comprises no more than three reference stations.

8. A GPS reference system as recited in claim 6 wherein the network of reference stations comprises at least four reference stations.

9. A GPS reference system as recited in claim 6 wherein:

the network of reference stations comprises no more than three reference stations;

each of the ephemeris and clock correction estimators computes at each of the measurement epochs the ephemeris correction for the corresponding GPS satellite when it is observed at the measurement epoch by the primary reference station and at least one of the secondary reference stations in accordance with:

$$\Delta r^k = G_W^T (G_W G_W^T)^{-1} \Delta^k$$

where:

k represents the corresponding GPS satellite;

$\Delta r^k$ is a vector containing the ephemeris correction at the measurement epoch for the corresponding GPS satellite;

$\Delta^k$ is a vector containing, for each of the secondary reference stations that observes the corresponding GPS satellite at the measurement epoch, the difference between the synchronized pseudo-range residual at the measurement epoch for the corresponding GPS satellite from the secondary reference station and the synchronized pseudo-range residual at the measurement epoch for the corresponding GPS satellite from the primary reference station;

$G_W$ is a matrix containing, for each of the secondary reference stations that observes the corresponding GPS satellite at the measurement epoch, the difference between a line of sight from the secondary reference station to the corresponding GPS satellite and a line sight from the primary reference station to the corresponding GPS satellite; and each of the ephemeris and clock correction estimators computes the clock correction at each of the measurement epochs for the corresponding GPS satellite in response to the computed ephemeris correction at the measurement epoch for the corresponding GPS satellite.

10. A GPS reference system as recited in claim 6 wherein:

the network of reference stations comprises at least four reference stations;

each of the ephemeris and clock correction estimators computes the ephemeris correction at each of the measurement epochs for the corresponding GPS satellite when it is observed at the measurement epoch by the primary reference station and at least one but no more than two of the secondary reference stations in accordance with:

$$\Delta r^k = G_W^T (G_W G_W^T)^{-1} \Delta^k$$

and when it is observed at the measurement epoch by the primary reference station and at least three of the secondary reference stations in accordance with: where:

$$\Delta r^k = (G_W^T G_W)^{-1} G_W^T \Delta^k$$

k represents the corresponding GPS satellite;

$\Delta r^k$ is a vector containing the ephemeris correction at the measurement epoch for the corresponding GPS satellite;

$\Delta^k$ is a vector containing, for each of the secondary reference stations that observes the corresponding GPS satellite at the measurement epoch, the difference between the synchronized pseudo-range residual at the measurement epoch for the corresponding GPS satellite from the secondary reference station and the synchronized pseudo-range residual at the measurement epoch for the corresponding GPS satellite from the primary reference station; and $G_W$ is a matrix containing, for each of the secondary reference stations that observes the corresponding GPS satellite at the measurement epoch, the difference between a line of sight from the secondary reference station to the corresponding GPS satellite and a line of sight from the primary reference station to the corresponding GPS satellite; and each of the ephemeris and clock correction estimators computes the clock correction at each of the measurement epochs for the corresponding GPS satellite in response to the computed ephemeris correction at the measurement epoch for the corresponding GPS satellite.

11. A method of providing ephemeris and/or clock corrections for GPS satellites to users at measurement epochs of the method utilizing a network of reference stations and a master station, the method comprising the steps of:

with each of the reference stations:

receiving GPS signals from those of the GPS satellites it observes and in response computing at each of the measurement epochs a pseudo-range residual for each of the GPS satellites it observes at the measurement epoch;

providing the computed pseudo-range residuals at each of the measurement epochs to the master station;

with the master station:

removing at each of the measurement epochs clock differences from the provided pseudo-range residuals so as to synchronize them in response to the provided pseudo-range residuals at the measurement epoch;

for each of the GPS satellites observed at each of the measurement epochs by the reference stations, computing at the measurement epoch an ephemeris correction and a clock correction for the corresponding GPS satellite in response to the synchronized pseudo-range residuals at the measurement epoch for the corresponding GPS satellite and independent of the synchronized pseudo-range residuals at the measurement epoch for the other GPS satellites observed by the reference stations; and transmitting at each of the measurement epochs the ephemeris and/or clock corrections for each of the GPS satellites observed at the measurement epoch by at least one of the reference stations;

wherein, for at least a subset of the measurement epochs, at least a subset of the GPS satellites for which the ephemeris and/or clock corrections are transmitted are observed by at least one but no more than three of the reference stations such that the transmitted ephemeris and/or clock corrections for each of the at least subset of GPS satellites at each of the at least subset of measurement epochs are computed in response to at least one but no more than three synchronized pseudo-range residuals for the GPS satellite at the measurement epoch.

12. A method as recited in claim 11 wherein the network of reference stations comprises no more than three reference stations.

13. A method as recited in claim 11 wherein the network of reference stations comprises at least four reference stations.

14. A method as recited in claim 11 wherein:

the network of reference stations comprises no more than three reference stations;

the ephemeris and clock corrections at each of the measurement epochs are computed in the ephemeris and clock correction computing step for the corresponding GPS satellite when it is observed at the measurement epoch by at least one of the reference stations in accordance with:

$$x^k = G_W^T(G_W G_W^T)^{-1}\Delta\rho^k$$

where:

k represents the corresponding GPS satellite;

$x^k$ is a state vector containing the ephemeris and clock corrections at the measurement epoch for the corresponding GPS satellite;

$\Delta\rho^k$ is a vector containing, for each of the reference stations that observes the corresponding GPS satellite at the measurement epoch, the corresponding synchronized pseudo-range residual at the measurement epoch for the corresponding GPS satellite; and $G_W$ is a matrix containing, for each of the reference stations that observes the corresponding GPS satellite at the measurement epoch, a line of sight from the reference station to the corresponding GPS satellite and an element that indicates that the corresponding synchronized pseudo-range residual in the vector $\Delta\rho^k$ should be adjusted by the clock correction in the state vector $x^k$ for the corresponding GPS satellite.

15. A method as recited in claim 11 wherein:

the network of reference stations comprises at least four reference stations;

the ephemeris and clock corrections at each of the measurement epochs are computed in the ephemeris and clock correction computing step for the corresponding GPS satellite when it is observed at the measurement epoch by at least one but no more than three of the reference stations in accordance with:

$$x^k = G_W^T(G_W G_W^T)^{-1}\Delta\rho^k$$

and when it is observed at the measurement epoch by at least four of the reference stations in accordance with:

$$x^k = (G_W^T G_W)^{-1} G_W^T \Delta\rho^k$$

where:

k represents the corresponding GPS satellite;

$x^k$ is a state vector containing the ephemeris and clock corrections at the measurement epoch for the corresponding GPS satellite;

$\Delta\rho^k$ is a vector containing, for each of the reference stations that observes the corresponding GPS satellite at the measurement epoch, the corresponding synchronized pseudo-range residual at the measurement epoch for the corresponding GPS satellite; and $G_W$ is a matrix containing, for each of the reference stations that observes the corresponding GPS satellite at the measurement epoch, a line of sight from the reference station to the corresponding GPS satellite and an element that indicates that the corresponding synchronized pseudo-range residual in the vector $\Delta\rho^k$ should be adjusted by the clock correction in the state vector $x^k$ for the corresponding GPS satellite.

* * * * *